United States Patent
Hoshi et al.

(10) Patent No.: US 6,210,127 B1
(45) Date of Patent: *Apr. 3, 2001

(54) FUEL PUMP

(75) Inventors: Yoshikazu Hoshi, Tokai-mura; Hideki Machimura, Hitachinaka, both of (JP)

(73) Assignees: Hitachi, Ltd., Tokyo; Hitachi Car Engineering Co., Ltd., Hitachinaka, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/733,323

(22) Filed: Oct. 17, 1996

(30) Foreign Application Priority Data

Oct. 19, 1995 (JP) ..................................... 7-270880

(51) Int. Cl.⁷ ....................................................... F04B 1/12
(52) U.S. Cl. ............................................................. 417/269
(58) Field of Search ................................... 417/269, 435; 92/70, 71

(56) References Cited

U.S. PATENT DOCUMENTS

| | | | | |
|---|---|---|---|---|
| 2,519,893 | * | 8/1950 | Deschamps et al. | 103/173 |
| 2,809,868 | * | 10/1957 | Thompson | 299/107.2 |
| 4,321,019 | * | 3/1982 | Degawa et al. | 417/269 |
| 4,550,630 | * | 11/1985 | Remus | 74/800 |
| 4,893,993 | * | 1/1990 | Shimizu | 417/269 |
| 5,051,067 | * | 9/1991 | Terauchi | 417/222 R |
| 5,137,431 | * | 8/1992 | Kiyoshi et al. | 417/269 |
| 5,172,623 | * | 12/1992 | Poisson | 91/46 |
| 5,391,058 | * | 2/1995 | Goto et al. | 417/223 |

* cited by examiner

Primary Examiner—Charles G. Freay
Assistant Examiner—Ehud Gartenberg
(74) Attorney, Agent, or Firm—Evenson, McKeown, Edwards & Lenahan, P.L.L.C.

(57) ABSTRACT

A motion converting mechanism for converting the rotating motion to the inclined gyration movement in a fuel pump is isolated from gasoline through a flexible isolating member. The lubrication of a load supporting portion in the fuel pump, which is enclosed in an interior portion of the flexible isolating member, can be performed. A sealing portion of a rotating shaft in the fuel pump is isolated from the gasoline by the flexible isolating member. The lubricating oil is sealed in an interior portion of an isolating area formed by the flexible isolating member.

17 Claims, 7 Drawing Sheets

FUEL PUMP

BACKGROUND AND SUMMARY OF THE INVENTION

The present invention relates to a fuel pump and, in particular to a gasoline use fuel pump suitable for an in-cylinder direct injection system used for in an internal combustion engine.

In an internal combustion engine, in particular in a gasoline internal combustion engine for use in an automobile, recent efforts have been made to improve fuel consumption, reduce harmful exhaust gas and improve driveability (a response for a drive condition changing) etc. of the automobile, by seriously studying a practical application of an in-cylinder direct injection system.

In the in-cylinder direct injection system of the gasoline internal combustion engine, a fuel delivery source is indispensable to directly inject the gasoline into a cylinder of the gasoline internal combustion engine. Since the gasoline injection into the cylinder is required even during a compression cycle of the engine, from the above stated fuel delivery source, it is necessary to delivery the fuel having a high pressure of some 30–100 kg/cm$^2$.

The gasoline to be delivered has an extremely small viscosity property and also has an inferior lubrication property in comparison with general use oil such as engine oil.

As a result, since the leakage of the gasoline from a compression part is large and it is difficult to compress the gasoline at a high pressure, a lubrication property in a fuel pump load supporting member (for example, a bearing member) is injured.

At the present time, the bearing member cannot be expected to have a needed life time under the gasoline environment.

Further, in a sealing member of a rotative shaft for the fuel pump construction, at the present time, it is extremely difficult to expect sufficient reliability of the sealing member under the gasoline environment.

From the above stated circumferences, a fuel pump is disclosed in, for example, Japanese patent laid-open publication No. 209,981/1992.

This conventional fuel pump construction attempts to overcome the above stated problems about the low gasoline viscosity property and the difficult compression to the high pressure.

Namely, in the above stated conventional fuel pump construction using the secondary fluid having the high viscosity and the high lubrication property, an increased pressure in the fluid is easily performed.

The gasoline is raised in pressure through a pressure transfer member (in this case, a bellows) and, in addition to the above, the lubrication in the load supporting member such as a bearing member is performed using the secondary fluid. Further, the secondary fluid becomes a sealing material for sealing a rotative shaft.

However, in the above stated conventional fuel pump construction, since the pressure transfer member is necessary for every compressing cylinder of the fuel pump, the number of components undesirably increases. Further, from a structural aspect in case of an employment of a multi-cylinder structure, the apparatuses must be arranged in an axial direction, thereby causing a problem where an axial direction dimension of the fuel pump construction increases.

In the above stated in-cylinder direct injection system for use in the internal combustion engine, from the viewpoint of the volume control accuracy of the injection fuel, the response for control, optimizing injection timing, it is desirable to control an injector electronically. To serve the above purpose, a small fluctuation of a delivery fuel pressure is required.

Accordingly, a large number of the compressing cylinders is desirably provided and, in case of the multi-cylinder structure, a compact size fuel pump structure should be realized.

An object of the present invention is to provide a multi-cylinder fuel pump of compact size.

Another object of the present invention is to provide a fuel pump wherein an improved lubrication property of a fuel pump load supporting member is achieved.

A further object of the present invention is to provide a fuel pump wherein a reliability property in a sealing structure for a rotative shaft can be increased.

A further object of the present invention is to provide a fuel pump wherein a lowering phenomenon of volume efficiency caused from low viscosity in fuel such as a gasoline can be fully realized by a compact multi-cylinder type fuel pump structure.

A further object of the present invention is to attain an increase of discharge flow amount of the fuel. According to the present invention, a fuel pump comprises a rotational shaft driven by a rotation of an internal combustion engine and a swash plate mounted on the rotational shaft in which a rotating motion of the rotational shaft is converted by an axial inclined gyration motion, and fuel is pressurized and compressed to raise pressure in accordance with an axial direction motion component of the swash plate. A rotating motion converting mechanism for converting the rotating motion of the rotational shaft to the axial inclined gyration movement is isolated through a flexible isolating member.

According to the present invention, a fuel pump comprises a rotational shaft for transmitting rotation from an outside motive source, a swash plate fixed on one end of the rotational shaft and for rotating together the rotational shaft and having a different normal direction face from an axial direction of the rotational shaft, plural pressurizing chambers for pressurizing fuel, and a rotating motion converting portion for converting a rotating motion of the rotational shaft to a reciprocating motion of the swash plate and for transmitting the reciprocating motion to the pressurizing chamber. The rotating motion converting portion is isolated through a flexible isolating member.

According to the present invention, a fuel pump comprises a rotational shaft for transmitting rotation from an outside motive source, a swash plate fixed on one end of the rotational shaft and for rotating together the rotational shaft and having a different normal direction face from an axial direction of the rotational shaft, plural pressurizing chambers for pressurizing fuel, and a rotating motion converting portion for converting a rotating motion of the rotational shaft to a reciprocating motion of the swash plate and for transmitting the reciprocating motion to the pressurizing chamber. A sliding and contacting portion formed between the swash plate and the rotating motion converting portion and the swash plate are isolated through a flexible isolating member.

According to the present invention, a fuel pump comprises a body, a rotating shaft penetrating mounted on the body, a swash plate member provided on an interior portion of the body and mounted on one end of the rotating shaft, a motion converting portion for converting a rotating motion of the rotating shaft to an inclined gyration movement, a pump mechanism portion opposite arranged to the swash plate member and having plural pistons which slide and contact the swash plate member, a first fluid section for receiving a first fluid which is pressurized according to an axial direction motion by the swash plate member, and a second fluid section adjacently provided on the first fluid section and for receiving a second fluid, and the second fluid section for including the motion converting portion, viscosity of the second fluid in the second fluid section is larger than viscosity of the first fluid in the first fluid section.

According to the present invention, a fuel pump comprises, a body having an opening portion at one end, a rotating shaft penetratingly mounted on the body, a swash plate member provided on an interior portion of the body and mounted on one end of the rotating shaft, a motion converting portion for converting a rotating motion of the rotating shaft to an inclined gyration movement, a pump mechanism portion provided on the opening portion of the body and opposite arranged to the swash plate member, and the pump mechanism portion having plural pistons which slide and contact to the swash plate member, a first fluid section provided on a side of the pump mechanism portion and for receiving a first fluid which is pressurized according to an axial direction motion by the swash plate member, and a second fluid section adjacently provided on the first fluid section and for receiving a second fluid, and the second fluid section for including the motion converting portion, viscosity of the second fluid in the second fluid section is larger than viscosity of the first fluid in the first fluid section.

According to the present invention, a fuel pump comprises a body having an opening portion at one end, a rotating shaft penetrating mounted on the body; a swash plate member provided on an interior portion of the body and mounted on one end of the rotating shaft, a motion converting portion for converting a rotating motion of the rotating shaft to an inclined gyration movement, a pump mechanism portion provided on the opening portion of the body and opposite arranged to the swash plate member, and the pump mechanism portion having plural pistons which slide and contact the swash plate member, a flexible isolating member provided in the interior portion of the body, a first fluid section provided on a side of the pump mechanism portion and isolated by the flexible isolating member, and the first fluid section for receiving a first fluid which is pressurized according to an axial direction motion by the swash plate member, and a second fluid section adjacently provided on the first fluid section and isolated by the flexible isolating member, and the second fluid section for receiving a second fluid and for including the motion converting portion, viscosity of the second fluid in the second fluid section is larger than viscosity of the first fluid in the first fluid section.

The basic concept of the present invention for solving the aforementioned problems is that the motion converting portion for giving the reciprocating motion of the pump compressing portion is enclosed by the flexible isolating member. Further another approach used in the present invention is that the lubricating oil is enclosed in the flexible isolating member.

In the present invention, the basic system of the fuel pump has the swash plate system, and this swash plate system is suitable to form both the small size and the multi-cylinder type fuel pump.

In the present invention, only the swash plate is caused to have the inclined gyration movement. The rotating motion preventing member is selectively provided on the swash plate, thereby to positively dissolve the rotation force acting on the flexible isolating member.

Further, because the rotation direction strength of the flexible isolating member is fully processed, the above mentioned rotating motion preventing member is unnecessary, and as a result the number of the pump components are reduced.

The end portion of the flexible isolating member is formed to selectively cause the eccentric inclined gyration movement and the stress easing generated on the flexible isolating member is attained.

In the present invention, the connecting portion for observing the pressure in the interior portion of the flexible isolating member is provided and the abnormality of the flexible isolating member is detected.

BRIEF DESCRIPTION OF DRAWINGS

These and other objects, features and advantages will become more apparent from the following detailed description of the preferred embodiments when taken in conjunction with the accompanying drawings wherein.

DETAILED DESCRIPTION OF THE DRAWINGS

Figure 1:
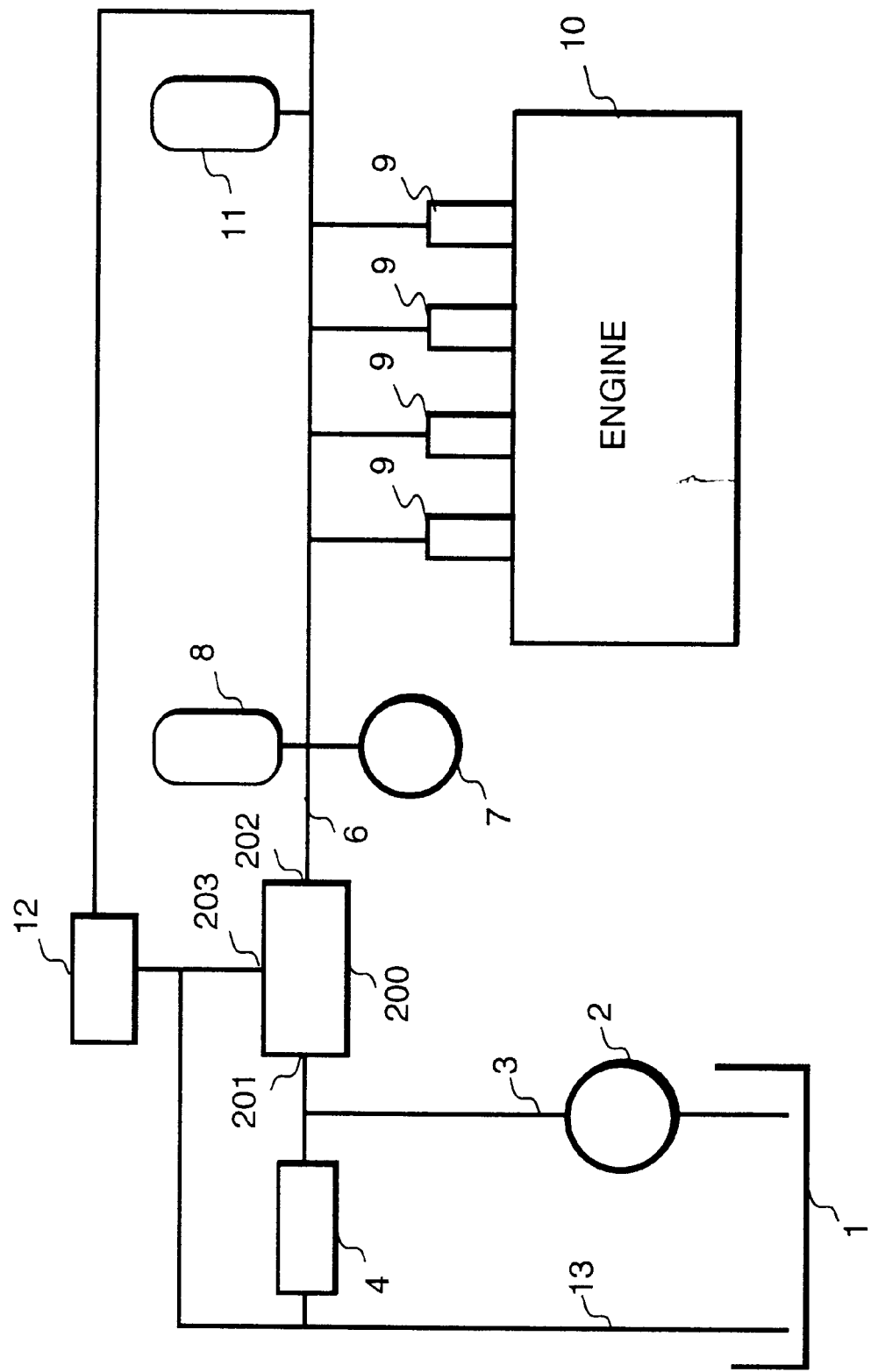
FIG. 1 is a block diagram showing a construction of an in-cylinder direct injection system for use in an internal combustion engine in which one embodiment of a fuel pump according to the present invention is used.

In an in-cylinder direct injection system for use in an internal combustion engine, a low pressure fuel pump 2 is installed in a fuel tank 1 as seen in FIG. 1. The fuel tank 1 is mounted on a vehicle such as an automobile and the low pressure fuel pump 2 is ordinarily driven by an electric motor.

The low pressure fuel pump 2 sucks and pressurizes the fuel received in the fuel tank 1 and the fuel is sent out from a low pressure fuel delivery piping 3.

A known low pressure regulator 4 is connected to the low pressure fuel delivery piping 3. This low pressure regulator 4 maintains the pressure to a low pressure fuel delivery piping portion constant and returns superfluous fuel through a fuel return piping 13 to the fuel tank 1. A pressure value of the fuel in the low pressure fuel delivery piping portion is 3 kg/cm$^2$ degree.

A fuel delivery portion 201 of a high pressure fuel pump 200 is connected to the low pressure fuel delivery piping 3. As the high pressure fuel pump 200, a fuel pump construction according to the present invention is applied. A high pressure fuel delivery piping 6 is connected to a fuel outlet portion 202 of the high pressure fuel pump 200.

On the high pressure fuel delivery piping 6, an upstream accumulator 8 and a downstream accumulator 11 a reselectively provided to reduce the fluctuation in pressure. A pressure sensor 7 is selectively provided on the high pressure fuel delivery piping 6 to detect an actual value of the pressure.

Plural injectors 9 are connected to the high pressure fuel delivery piping 6, and these injectors 9 are installed in the engine 10 and control the fuel injection amount by the respective injector 9.

Further, the high pressure fuel delivery piping 6 is connected to a high pressure regulator 12 at a downstream side of the high pressure fuel delivery piping 6. The high pressure regulator 12 maintains a constant pressure in the high pressure fuel delivery piping 6, and the superfluous fuel is discharged to the fuel return piping 13.

A fuel relief portion 203 is selectively provided on the high pressure fuel pump 200, and this fuel relief portion 203 operates to return the fuel in the high pressure fuel pump 200 toward the fuel return piping 13 if necessary. As a result, the fuel pressure in the high pressure fuel delivery piping 6 is maintained substantially constant.

Figure 2:
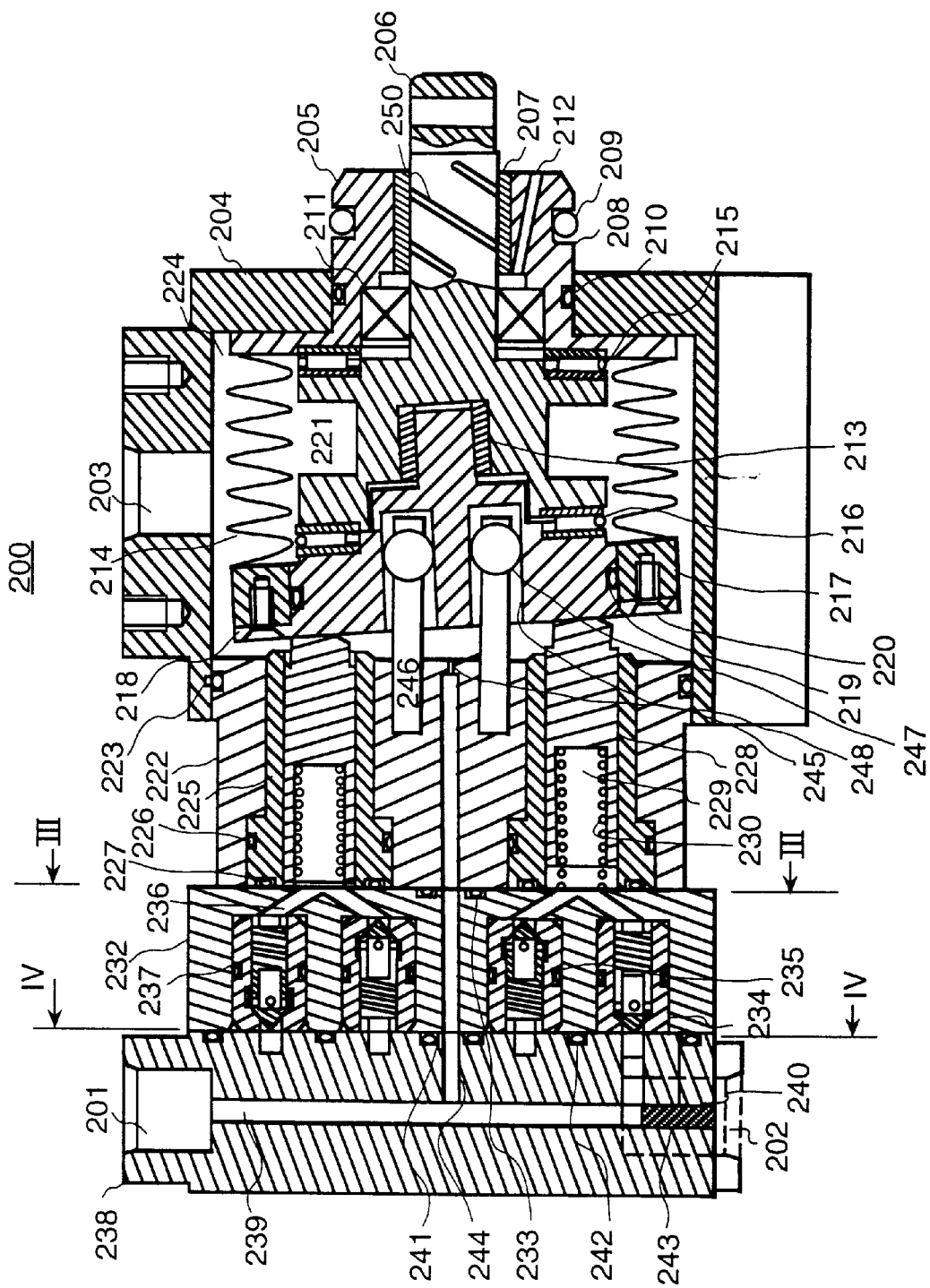
FIG. 2 is a cross-sectional view showing one embodiment of a fuel pump according to the present invention.

One embodiment of the fuel pump of the present invention as the high pressure fuel pump 200 is illustrated in FIG. 2 and will now be explained.

In the high pressure fuel pump 200, a rotating shaft 206 is connected to and driven by a driving shaft of the engine 10, such as a cam shaft of intake and/or exhaust valves, through a suitable connector. The shaft 206 is installed through a body 204 at a suitable position of the engine 10.

The above stated fuel relief portion 203 is provided on the body 204 as an aperture, preferably at an upper portion of the body 204. The above stated fuel return piping 13 is connected to a bore formed on the fuel relief portion 203 through a connector (not shown). When the fuel relief portion 203 is formed with a flange, the fuel relief portion 203 is fixed to an installing screw hole using a connecting tool.

A thrust force (toward the right in FIG. 2) on the shaft 206 is supported through a bearing member 215, and a radial force on the shaft 206 is supported through a bearing member 207. These two bearing members 215, 207 are supported by a driving and supporting portion 205 which is inserted with pressure to the body 204.

A sealing member 210 is mounted between the body 204 and the driving and supporting portion 205, and prevents leakage of fluid from a clearance formed between the body 204 and the driving and supporting portion 205.

A circular groove 208 is provided at a vicinity of a right end portion of the driving and supporting portion 205 and has a sealing member 209 therein. The sealing member 209 engages a cylindrical fixing portion for surrounding a driving shaft portion of the engine 10 and prevents the leakage of the lubricating oil from the groove portion.

An oil induction groove 250 is provided on a surface of the rotative shaft 206 for taking in the lubricating oil which is included in the right portion of an driving and supporting portion 205. A lubricating oil sealing member 211 is inserted with pressure to the driving and supporting portion 205 and prevents the leakage of the fluid present at the right side.

The oil taken into the lubricating oil sealing member 211 gives a lubricating effect to the lubricating oil sealing member 211 and the surface of the rotating shaft 206. An oil return hole 212 is provided on the body 204 tore turn the superfluous oil.

A left end portion of the shaft 206 has an inclined shape relative to a right angle cross-section of the shaft 206. A swash plate thrust bearing member 216 is provided on the left end portion of the shaft 206. Further, a swash plate 218 is provided at a left side of the swash plate thrust bearing member 216.

A hole and a swash plate bearing member 213 mounted in the hole are provided at an interior portion of the shaft 206. The hole is inclined relative to the center axis of the shaft 206. The swash plate bearing member 213 engages the right end portion of the swash plate 218 and supports a radial force of the swash plate 218. A fixing force for engaging the swash plate 218 (toward the left in FIG. 2) is given by the plungers 228 as described below.

The right side of the shaft 206 is supported by the bearing member 215, and at the left side of the shaft 206, the rotating motion of the shaft 206 with the swash plate 218 is shielded by the swash plate thrust bearing member 213.

Therefore, the shaft 206 can freely rotate and, from another viewpoint, the swash plate 218 is not rotating but performs an inclined gyration movement where an inclination direction of the center axis of the swash plate 218 rotates.

A flexible isolating member 214 is fixed to the left side of the driving and supporting portion 205 by welding, for example. A finished end portion 217 of the flexible isolating member 214 is fixed to another end of the flexible isolating member 214 by welding, for example.

The end portion 217 of the flexible isolating member 214 is tight-sealed fixed against the swash plate 218 by cooperating with the sealing member 219 and further is fixed by a fixing member 220.

A rotating motion converting mechanism for converting from the rotating motion to the inclined gyration movement of the swash plate 218 includes the oil sealing member 211, the bearing members 215, 216, the rotative shaft 208, and the swash plate bearing member 213. As a result, this rotating motion converting mechanism has an isolating section 221 which is isolated from other components.

A pressuring body 222 is installed in an oil-sealed manner to the body 204 by cooperating with the sealing member 223. A sleeve 225 for forming a fuel pressurizing chamber is oil-sealed installed by inserting a sleeve side face of a sealing member 226 at an outer peripheral portion and a sleeve bottom face sealing member 227 at a bottom face portion.

A fuel relief section 224 is formed outside of the flexible isolating member 214. In other words, the isolating section 221 and the fuel relief section 224 are divided by the flexible isolating member 214.

The plunger 228 is installed in a free-sliding manner in the right and left directions in an interior portion of the sleeve 225. A spring member holding portion 229 is formed on the left end portion of the plunger 228 and receives the force of a spring member 230 and further operates forcing the plunger 228 toward the right.

A check body 232 is connected to the left end portion of the pressuring body 222. Plural intake check valves 234 are included at an outer peripheral portion side of the interior portion of the check body 232 and allow the fuel to flow into the plunger 228.

Plural outlet check valves 235 are included at an inner peripheral portion side of the interior portion of the check body 232 and allow the fuel to flow out of the plunger 228.

A detail of one embodiment of the intake and outlet check valves 234, 235 will be explained later with reference to FIG. 8. To obtain oil-sealed installation of the both intake and outlet check valves 234, 235, the check valve sealing members 237 are installed to the outer peripheral portions of the intake and outlet check valves 234, 235.

Figure 3:
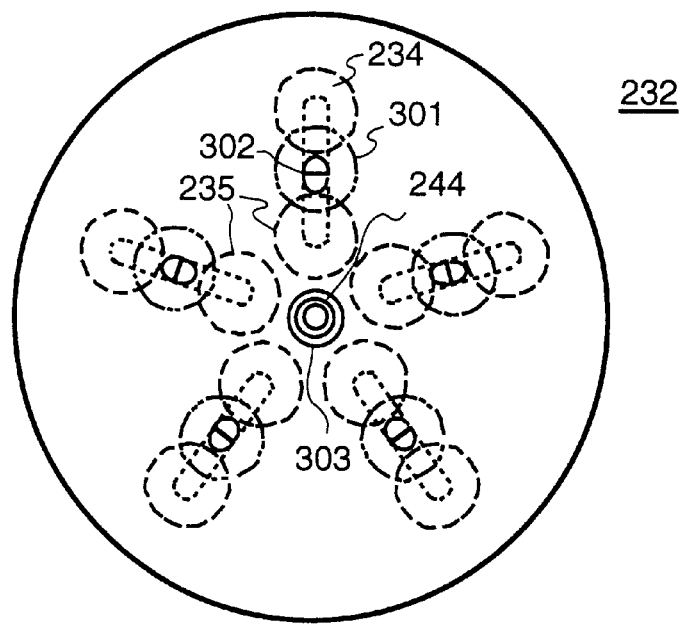
FIG. 3 is a plan view showing the fuel pump taking along line III—III of FIG. 2.

Referring to FIGS. 2 and 3, a structure of the check body 232 will be clearly explained in detail.

A fuel delivery hole 244 is provided on a central portion of the check body 232, and a right side sealing groove 303 of the check body 232 for receiving a central sealing member 233 is provided at an outer peripheral side of the fuel delivery hole 244.

A place for connecting the outlet check valve 235 is shown with a dotted line at the outer peripheral portion of the check body 232, and further at the most outer peripheral portion a place for connecting the intake check valve 234 is shown with a dotted line.

At the central portion of both intake and outlet check valves 234, 235, a location 301 for arranging the plunger 228 is shown with a two-dot chain line on the pressurization body 222 as seen in FIG. 3.

The intake check valve 234, the outlet check valve 235 and the plunger 228 constitutes plural sets, with the structure shown in the drawings corresponding to a formation of a five-cylinder axial plunger pump. At a plunger arrangement portion, a check hole opening portion is provided, and a hole 302 for communicating with the intake check valve 234 and the outlet check valve 235 are formed from a lower portion of the plunger 228.

An end portion body 238 is connected to the left side of the check body 232. The check body 232 and the pressuring body 222 are fastened and fixed to the end portion of the body 238 using a through-bolt.

Figure 4:
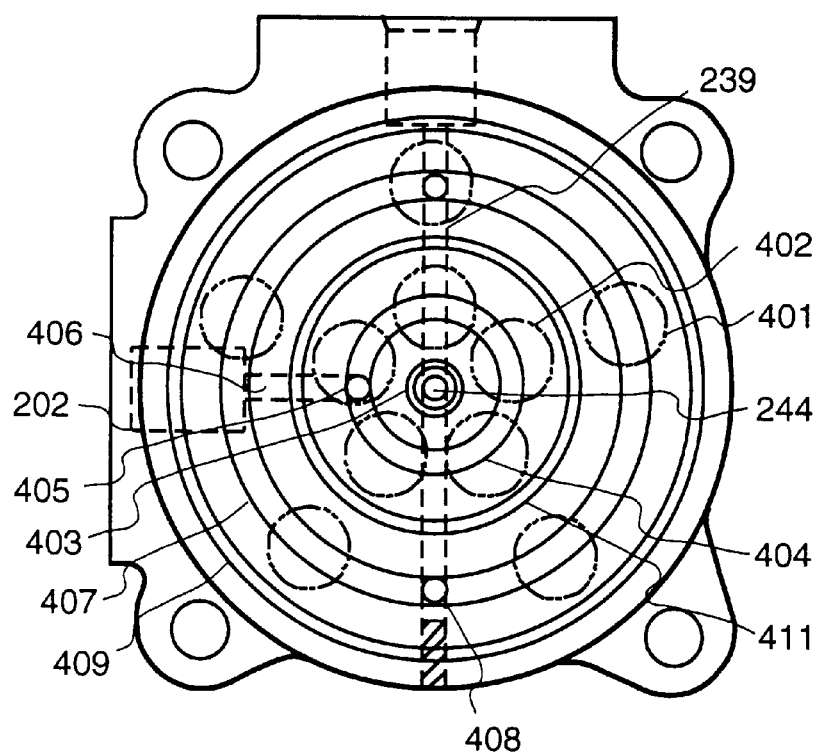
FIG. 4 is a plan view showing the fuel pump taking along line IV—IV of FIG. 2.

Referring to FIGS. 2 and 4, the structure of the end portion body 238 will clearly explained in detail.

The fuel delivering portion 201 is provided on the end portion body 238 in a similar manner shown in the above stated fuel relief portion 203. An intake hole 239 is bored to penetrate through across the central portion of the rotative shaft 206, and the most remote end portion of the intake hole 239 is sealed by a plug 240.

A fuel delivery hole 244 for communicating the intake hole 239 is provided at a central portion of the end portion body 238 and communicates with a central hole of the check body 232 and a central hole of the pressurizing hole 222. An orifice 245 is selectively provided on a exit portion of the central hole of the pressurizing body 222.

The fuel delivery hole 244 is provided on the central portion of the end portion body 238. A central sealing groove 403 is provided at an outer peripheral portion of the fuel delivery hole 244 and receives a central sealing member 241. A fuel outlet circular ring form groove 404 is provided at an outer peripheral portion of the central sealing groove 403.

The position of the fuel outlet circular groove 404 is shown in an outlet check valve arrangement portion 402 which is indicated by a two-dot chain line in FIG. 4. An outlet opening portion of the outlet check valve 235 is formed to communicate to the fuel outlet circular groove 404.

An intermediate sealing groove 411 for receiving an intermediate sealing member 242 is provided at an outer peripheral portion of the outlet circular groove 404.

A fuel delivery circular groove 407 is provided at an outer peripheral portion of the intermediate sealing groove 411. The position of the fuel delivery circular groove 407 is shown in an intake check valve arrangement portion 401 which is indicated by a two-dot chain line in FIG. 4. The fuel delivery circular groove 407 is formed to communicate to a left end side opening portion of the intake check valve 234.

As shown in FIG. 4, a fuel outlet portion 202 is provided at the left end portion of the end portion body 238. An outlet vertical hole 406 for communicating with the fuel outlet portion 202 is provided on the fuel outlet portion 202, and an outlet horizontal hole 405 for communicating to the fuel outlet circular groove 404 is also provided. In other words, the fuel outlet circular groove 404 is communicated with the fuel outlet portion 202.

Likewise, the intake hole 239 and the fuel delivery circular groove 407 are communicated with at least one fuel delivery vertical hole 408, whereby the fuel delivery portion 201 communicates with the fuel delivery circular groove 407.

An outer circular sealing groove 409 is provided at the most outer peripheral portion of the end portion body 238 and receives an outer circular sealing member 243.

A rotation fixing shaft 246 is provided on the pressurizing body 222 and a hole-machined ball 247 is engaged free-slidingly to the rotation fixing shaft 246.

Plural ball receiving holes 248 are provided on the swash plate 218 at a right angle to the end surface of the rotative shaft 206 and engage with the hole-machined ball 247. Three is a necessary and sufficient number of the plural ball receiving holes 248.

A component group, which is comprised of the shaft 246, the hole machined balls 247 and the plural ball receiving holes 248, is acted on as a rotating motion preventing member for regulating the rotating motion of the swash plate 218.

In the present invention, the swash plate 218 is a parallel shape rotating member, and the swash plate 218 is inclined relative to the rotating shaft 206.

Operation of one embodiment of the fuel pump explained by the structure shown in FIG. 1 to FIG. 4 according to the present invention will be explained.

The low pressure fuel supplied from the low pressure fuel delivery piping 3 is connected to the fuel delivery portion 201 of the fuel pump and reaches the fuel delivery circular groove 407 through the intake hole 239 and the fuel delivery vertical hole 408.

After that the fuel pushes the intake check valve 234 open and reaches the lower portion of the plunger 228. When the plunger 228 leaves room toward the right, then the fuel moves the plunger 228.

The spring member 230 is received at the lower portion of the plunger 228. A spring force by the spring member 230 moves the plunger 228 and sucks the fuel, therefore the plunger 228 is moved toward the right direction. A head portion at the right side of the plunger 228 is formed with a spherical shape and contacts the swash plate 218.

The left end portion of the shaft 206 is inclined relative to the right angle cross-section of the shaft 206, and the rotating motion of the inclined face of the shaft 206 is transmitted to the swash plate 218 through the swash plate thrust bearing member 216.

Therefore, the swash plate 218 does not perform the rotating motion but causes the inclined gyration movement in which the center axis of the swash plate 218 is inclined. Since the head portion of the plunger 228 contacts the left end portion of the swash plate 218, at the head portion of the plunger 228 the swash plate 218 causes a leftward/rightward reciprocating motion.

In the reciprocating motion of the swash plate 218, the motion toward the right effects an intake process and, as stated above the right direction motion operates to fill up the fuel at the fuel pressurizing section which is formed at the lower portion of the plunger 228.

The motion toward the left direction of the plunger 228 effects a compression process, and the fuel at the fuel pressurizing section portion 231 is pressurized with a rise in pressure. The pressurized fuel pushes a poppet valve of the outlet check valve 235 open through the check hole 236.

Thereafter, the fuel reaches the fuel outlet circular groove 404 and is discharged from the fuel outlet portion 202 to the high pressure fuel delivery piping 6.

At this time, the pressurized fuel is led to the intake check valve 234 through the check hole 236; however, at the intake check valve 234, because the pressure operates to a closing direction of the poppet valve, the relief of the fuel is prevented.

The fuel having the pressure at the fuel outlet circular groove 404 is sealed by the central sealing member 241 and the intermediate sealing member 242 and so that the leakage of the fuel to other portions is prevented.

Similarly, the fuel having the pressure at the fuel outlet circular groove 407 is sealed by the intermediate sealing member 242 and the outer circular groove 243 so that the leakage of the fuel to other portions is prevented.

In this embodiment of the present invention, the intake check valve 234 is arranged at the outer peripheral portion of the outlet check valve 235. An area surrounded by the outer circular groove 244 and the intermediate sealing member 242 is larger than an area surrounded by the intermediate sealing member 242 and the central sealing member 241. The low pressure acts on the larger section side, therefore reducing an axial direction separating force due to the fuel.

The fuel being led from the fuel delivery portion 201 has a pressure of 3 kg/cm$^2$ degree. The fuel vapors are not generated even where the fuel exists on a high temperature atmosphere in the vicinity of the engine 10. Further, cavitation is not generated even where the fuel pump is effecting the intake process. Therefore, the force feeding ability of the fuel pump can be fully obtained.

Because the fuel is discharged to a right side section through the orifice 245, the fuel is fully at the low pressure, desirably under the pump operating condition the fuel is returned to the fuel tank 1 through the fuel return piping 13 from the fuel relief portion 203 which is provided toward an upper direction.

Because the swash plate 218 does not perform the rotating motion but performs only the inclined gyration movement, a relative sliding distance between the swash plate 218 and the plunger 228 is small. In other words, under the complete drying condition there is a possibility about an occurrence of a problem in wear etc.

However, a sliding portion formed between the swash plate 218 and the plunger 228 is enclosed by the low pressure fuel to reduce the wear problem.

The rotating motion converting mechanism for converting the rotating motion of the shaft 206 to the inclined gyration movement of the swash plate 218 is isolated from the other components by the flexible isolating member 214, thereby the gasoline does not flow into the rotating motion converting mechanism.

As a result, a portion comprised of the bearing members 215, 216 and 213, which are included in the rotating motion converting mechanism, and the oil sealing member are isolated from the gasoline, and according to the circumstance a grease member can be used.

In the isolating section 221, the lubricating oil (for example, engine oil, synthetic oil etc.) can be enclosed therein. With the above stated construction, the lubricating property in the load supporting portion (for example, bearing member) can be maintained.

In the interior portion of the isolating section 221, the shaft 206 rotates and the lubricating oil is agitated without a change in an entire volume of the lubricating oil. Accordingly, the lubricating oil can fill up almost all of the isolating section 221.

Inasmuch as the isolating section 221 does not originally contact outside fresh air, an oxidation rendering the lubricating oil inferior is prevented. Further, since the amount of air is reduced by increasing a fill-up amount of the lubricating oil, oxidation can be further reduced.

Further, by filling up the isolating section 221 using an inert gas or by evacuating the isolating section 221, the oxidation can be further reduced, therefore achieving a rotating motion converting mechanism having a high reliability.

In the above embodiment of the present invention, five plungers 228 are arranged with a same angle interval at a surrounding portion of the shaft 206 of the fuel pump 200. Since the compression process is performed with the swash plate 218 by successively changing phase, a multiple fuel discharge is carried out.

For the in-cylinder direction injection system having the small fluctuation, a suitable fuel discharge is carried out. To reduce fluctuation in the amount of fuel discharge, a multi-cylinder fuel pump is indispensable, and the present invention provides the fuel pump with a compact size and a high reliability.

An axial plunger fuel pump is most desirable, such an axial plunger arranges plural pressurizing plungers at an axial direction.

A fuel pump having the desired properties can be realized by combining the above stated system fuel pump to the above stated rotating motion converting mechanism having high reliability.

In the embodiment of the fuel pump according to the present invention, in the compression mechanism portion the gasoline is directly pressurized, the leakage caused from the compression portion due to the low viscosity gasoline and the volume effect is minimized.

However, use of the rotating motion converting mechanism having high reliability, for example, to slightly increase the reciprocation stroke of the plunger, the lowering portion in the flow amount is easily compensated.

Now, the rotating motion preventing member will be explained as following. In this connection, U.S. Pat. No. 5,129,797 is incorporated by reference herein.

Figure 5:
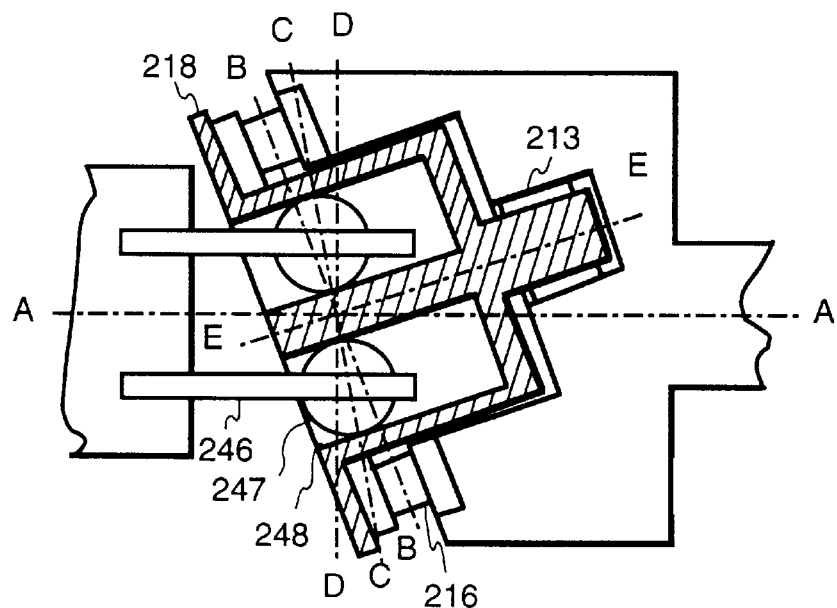
FIG. 5 is a cross-sectional view showing one embodiment of a rotating motion preventing mechanism of a fuel pump according to the present invention.

FIG. 5 is one example of the rotating motion preventing mechanism of the fuel pump. In FIG. 5, line A—A is the rotation center of the rotating shaft 206, line B—B is the rotation plane of the swash plate thrust bearing member 216 at a particular moment, line C—C is a ball alignment plane at the same particular moment, line D—D is the rotation cross-section of the shaft 206, and line E—E is the supporting center axis of the swash plate 218 at the same particular moment.

In this rotating motion preventing member, the hole machined ball 247 is engaged with the outer peripheral portion of the rotation fixing shaft 246, and essentially the hole machined ball 247 can freely slide right and left of the rotation fixing shaft 246.

Three set s comprised of the rotation fixing shaft 246, the hole machined ball 247, and the ball receiving hole 248 provided on the swash plate 218 are a sufficient number from an economical aspect.

In this embodiment illustrated in FIG. 5, the center point of the bearing member 216 in a line A—A and a line B—B and the center point of the ball alignment plane cross at one point. The center of the bearing member 216 does not move from only the axial inclined gyration movement.

At this time, to position the hole machined ball 247 at an intermediate plane between the line B—B and the line D—D, the hole-machined ball 247 slides on the rotation fixing shaft 247 and the ball receiving hole 248. The above stated relationship allows only the axial inclined gyration movement by fixing the rotation of the swash plate 218 with the rotation fixing shaft 246 being fixed.

Figure 6:
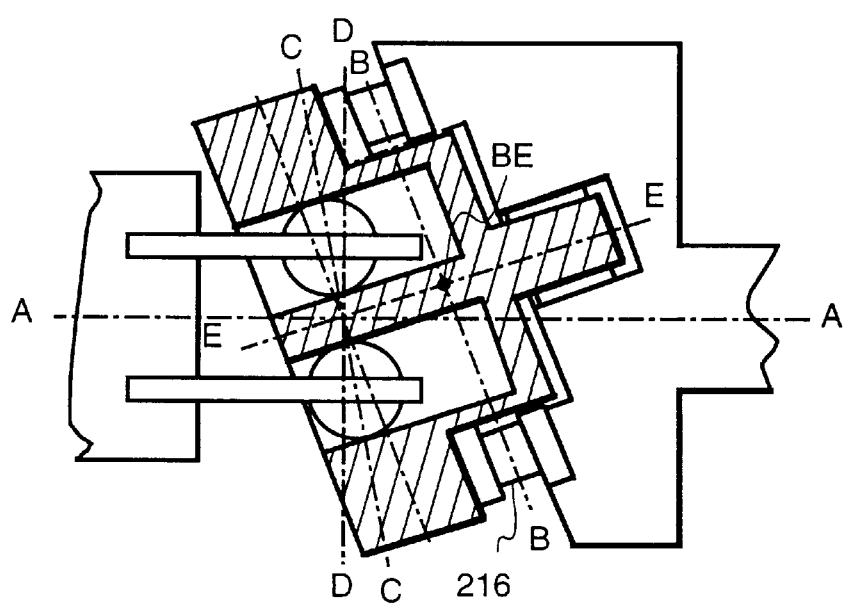
FIG. 6 is a cross-sectional view showing another embodiment of a rotating motion preventing mechanism of a fuel pump according to the present invention.

FIG. 6 shows another example of the rotating motion preventing member of the fuel pump. In FIG. 6, the same parts shown in FIG. 5 are indicated by the same reference numbers.

The rotation plane of the bearing member 216 is moved toward the left from the intersecting point of the line A—A and the line B—B.

Because the center of the bearing member 216 is necessary to position an inclination axis E—E, as shown at point BE and the center of the bearing member 216 is separated from the center axis A—A of the rotative shaft 206, the entire bearing member performs an eccentric rotating motion. Such an eccentric rotating motion causes an excess load on the bearing member 216, so that the eccentric rotating motion is undesirable.

Therefore, it is desirable to apply the structure shown in FIG. 5. A further study will be explained by returning to FIG. 5.

Paying attention to a left end face of the swash plate 218, an intersecting point between the swash plate 218 and the line and an axis E—E of the swash plate 218 is positioned at the lower portion from the center axis A—A of the shaft 206. Supposing that in case where a face positions at the right side from the line B—B, the above intersecting point will be positioned at the upper portion side from the center axis A—A.

The above phenomenon causes a natural eccentric motion at the outer peripheral portion of the swash plate 218. An eccentric direction and an eccentric amount change in accordance with the position on the axis E—E. The above stated phenomenon are utilized as follows.

Figure 7A:
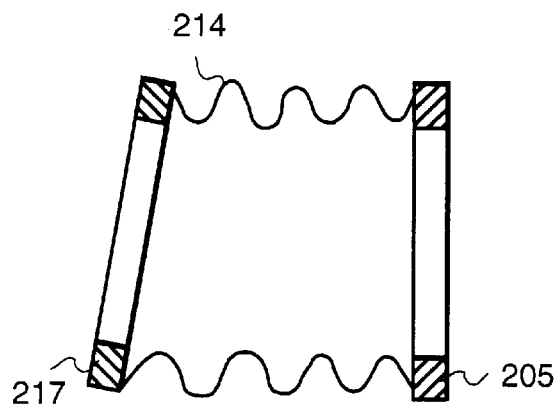
FIG. 7A is a cross-sectional view showing a modified embodiment of a flexible isolating member of a fuel pump where the flexible isolating member performs an inclined gyration movement without eccentricity.
Figure 7B:
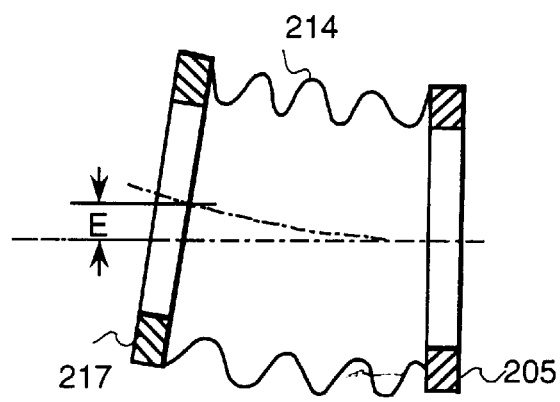
FIG. 7B is a cross-sectional view showing a modified embodiment of a flexible isolating member of a fuel pump where the flexible isolating member performs an inclined gyration movement having some eccentricity.

FIG. 7A and FIG. 7B are schematic views showing modified embodiments of the flexible isolating member 214. As a material for the flexible isolating member, a metal bellows can be selected on the basis of reliability, in particular a stainless steal bellows can be selected because of its anti-corrosion property.

A driving and supporting portion 205 is fixed by welding at an end portion of the flexible isolating member 214. A finish end portion 217 of the flexible isolating member 214 is fixed at another end portion of the flexible isolating member 214 with welding, and the finish end portion 217 of the flexible isolating member 214 is installed to a swash plate (not shown).

Where the upper end portion of the flexible isolating member 214 is installed to coincide with the line B—B shown in FIG. 5, the center of the upper portion of the flexible isolating member 214 performs the inclined face revolving movement without eccentricity, as shown in FIG. 7A.

This is always undesirable but as shown in FIG. 7B, it is desirable to perform the inclined face revolving movement being accompanied by the eccentric motion having an eccentric amount E.

Optimization of the eccentric amount can be determined by utilizing the relationship explained above with respect to FIG. 5 and FIG. 6.

Figure 8:
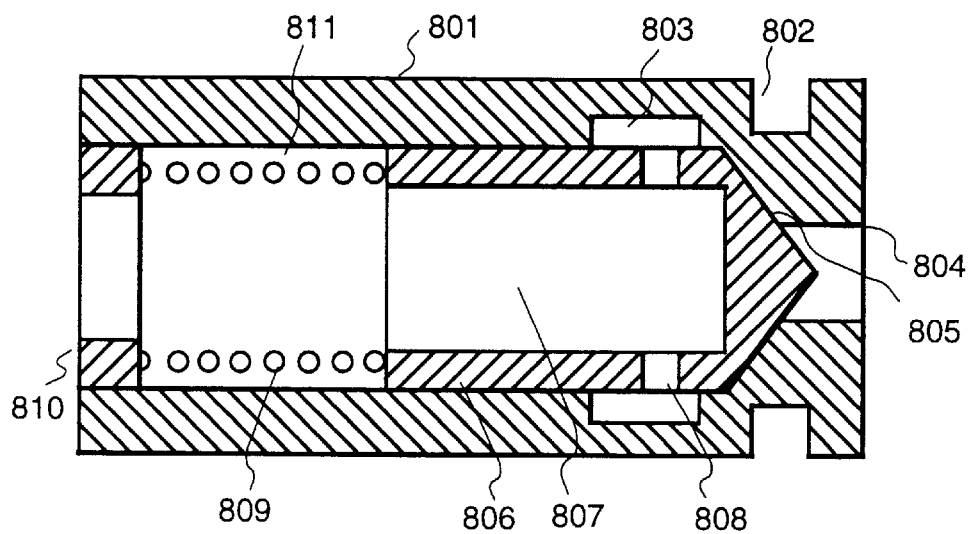
FIG. 8 is a cross-sectional view showing one embodiment of a check valve for the fuel pump of FIG. 2.

The intake check valve 234 and the outlet check valve 235 basically adopt the same structure shown in FIG. 8. A sealing groove 802 for installing a check valve sealing member 237 is provided on an outer peripheral portion of a valve outer cylinder 801.

A guide hole 811 is formed at a central portion of the valve outer cylinder 801, and a poppet valve 806 is slidingly held in the guide hole 811.

A hole 804 is provided at a right end portion of the valve outer cylinder 801 and in succession to the hole 804 a seat portion 805 having a tapering shape is formed. An inner diameter enlarging portion is provided at a vicinity of the left end portion of the guide hole 811.

A right end portion of the poppet valve 806 is formed with a tapered shape and engages with the seat portion of the valve outer cylinder 801. A hollow portion 807 is formed at an interior portion of the poppet valve 806, and an escape hole 808 for communicating the hollow portion 807 and an outer face is provided.

A hollow spring fixing member 810 is inserted with pressure in the left end portion of the guide hole 811 of the valve outer cylinder 801. A spring member 809 is fixed under bias between the spring stop member 810 and the left end portion of the valve outer cylinder 806.

Because the poppet valve 806 is pushed to contact the seat portion of the valve outer cylinder 801 under a suitable force and maintains the sealing state, the poppet valve 806 operates to prevent the fuel flow against the pressure from the left side of the poppet valve 806.

When the pressure from the right side of the poppet valve 806 reaches a predetermined value, the force from the left side added to the poppet valve 806 is larger than the force obtained by the spring member 809 and the poppet valve 806 is moved toward the left side.

Therefore, the fuel flow is formed from the right side to the left side through a hole comprised of a tapered portion inner diameter enlargement portion 803, the escape hole 808 and the hollow portion 807.

Figure 9:
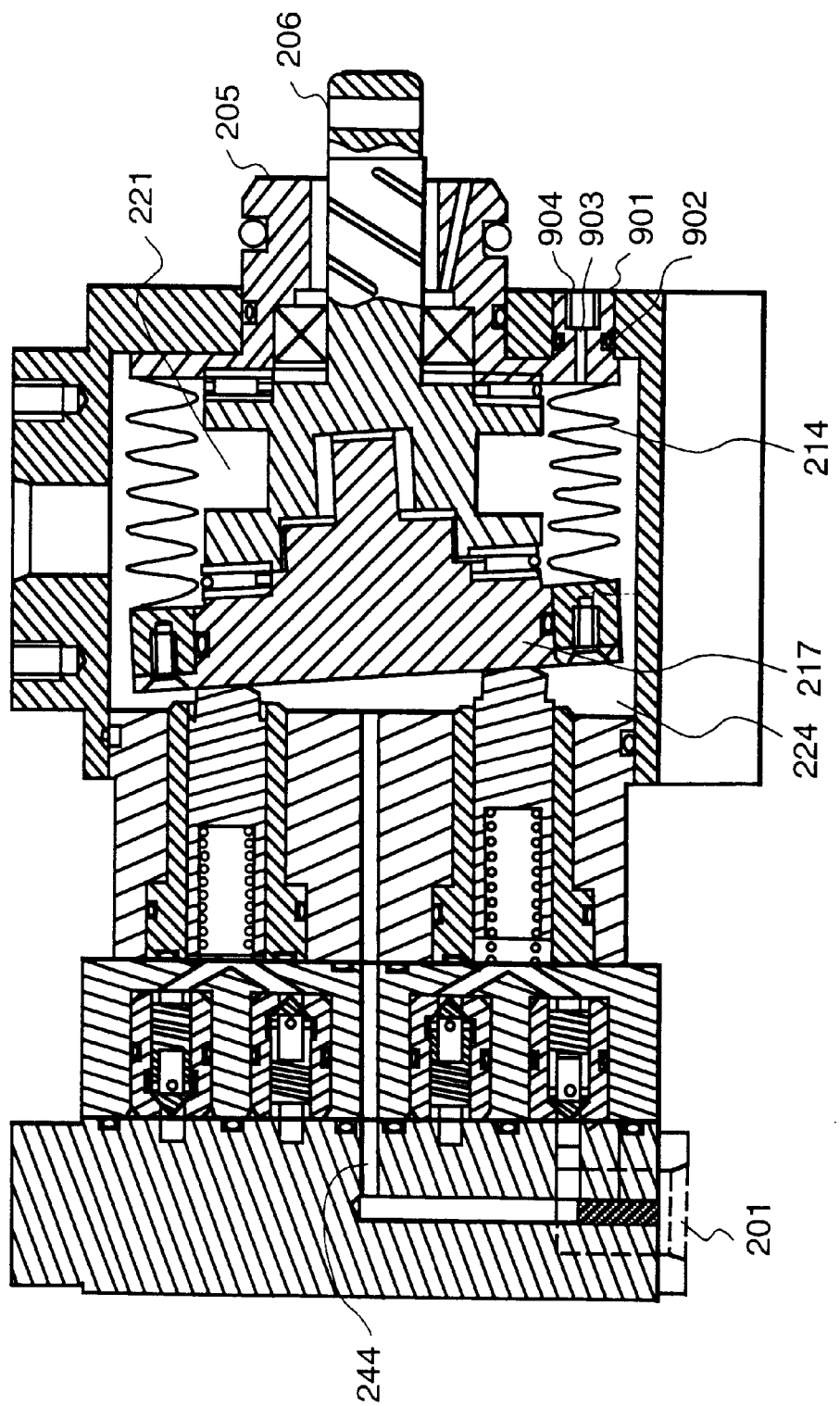
FIG. 9 is a cross-sectional view showing another embodiment of a fuel pump according to the present invention.

In FIG. 9, the reference numbers indicate only parts different from the embodiment shown in FIG. 2.

One difference is that the rotating motion preventing member is omitted in FIG. 9. In the fuel pump construction of FIG. 9, the rotation resisting force is increased by increasing the thickness of the material of the flexible isolating member, for example. Thereby, the number of components can be reduced.

In a mechanism shown in FIG. 9, the fuel pressure on the plunger and the spring force in the plunger operate as a restraint force against the swash plate 218.

In this case, the relationship of the eccentric motion used in FIG. 5 does not change, and the above relationship is determined in accordance with an installing face of the bearing member and the positional relationship of the flexible isolating member. Therefore, the eccentric motion amount can arbitrarily selected.

A second difference is that the orifice 245 is deleted. The fuel delivery is performed from a connection port side which is the fuel relief portion in the construction of FIG. 2, and fuel delivery is performed from the fuel delivery hole 244 through the intake hole 239. In this case, the pressurized fuel exists outside of the flexible isolating section.

A third difference is that a projecting portion 901 is provided on a part of the driving and supporting portion 205, and this projecting portion 901 has a hole for communicating with the flexible isolating section. The projecting portion 901 permits the pump body and a sealing member 902 to be sealingly engaged.

With the above structure, the lubricating agent can be delivered to the sealing section, and also the pressure detecting means in this section can be connected. Where the pressure outside of the flexible isolating member is higher than the pressure of the interior portion of the flexible isolating member, a rise in pressure at the interior portion of the flexible isolating member is detected and judged, and failure or the abnormality in the flexible isolating member can be detected.

The the pressure of the interior portion of the flexible isolating member is held under the vacuum state during initial manufacturing.

According to the present invention, a fuel pump such as a gasoline pump suitable for use in the in-cylinder direct injection system having a compact size and a small fluctuation is achievable.

In particular, the motion converting mechanism for converting the rotating motion to the axial inclined gyration movement of the swash plate is isolated from the other components by the flexible isolating member, and the rotating motion converting mechanism does not contact fuel such as a gasoline.

Therefore, the problem about the lubrication for the load supporting portion in the rotating motion converting mechanism has been solved. Further, because the sealing portion of the rotating shaft does not contact the fuel, such as a gasoline, the problem of swash plate wear and the problem of leakage of the lubricating oil can be avoided.

In a case where the isolating section is filled up with the proper amount of lubricating oil, the contact of the lubricating oil with the fresh air is prevented, and thus deterioration of the lubricating oil is prevented and the high reliability property fuel pump can be attained.

Since a portion of the delivery fuel is at low pressure and is led to the connecting portion or the sliding portion between the swash plate and the plunger, the cooling effect in the connecting portion and the lubrication effect can be achieved, a high reliability property fuel pump having reduced wear and reduced friction force can be supplied.

Similarly because the fuel is led outside of the flexible isolating member, a cooling effect is obtained on the flexible isolating member and lubricating oil in the interior portion of the rotating motion converting mechanism. Therefore, a high reliability property fuel pump can be obtained.

The intake check valve and the outlet check valve are radially arranged according to the number of the cylinders, and the outlet check valves are arranged at the inner peripheral portion, such that the pull apart force in the pump axial direction due to the reaction force of the high pressure fuel can be reduced. Therefore, compact size and high reliability of the fuel pump can be realized.

The rotating motion preventing member for positively preventing the rotating motion of the swash plate means the rotation force acted on the flexible isolating member is avoided, and the stress on the flexible isolating member is reduced. Therefore, high reliability property fuel pump can be further provided thereby.

Where the pressurized delivery fuel is led from outside the flexible isolating member to the intake side of the intake check valve through the fuel pump, the fuel relief portion is unnecessary. Therefore, the piping structure of the fuel pump can be simplified.

Because the gyration movement eccentric amount of the end portion of the flexible isolating member is suitably selected in accordance with the flexible isolating member, an easing of the stress on the flexible isolating member is attained. Therefore, again high reliability property fuel pump results.

The connecting portion for observing the pressure in the interior portion of the flexible isolating member is provided, and therefore damage to and the abnormality of the flexible isolating member can be detected. As a result, a vehicle having the fuel pump according to the present invention is safer. According to the above described embodiments of the fuel pump according to the present invention, the swash plate 218 is provided on the interior portion the body 204 and is fixedly mounted on one end of the rotating shaft 206. The rotating motion converting mechanism converts the rotating motion of the rotating shaft 206 to the inclined gyration movement of the swash plate 218.

The pump mechanism portion is provided on the opening portion of the body 204 and is arranged opposite the swash plate 218. The pump mechanism portion has plural pistons comprising the sleeves 225 and the plungers 228. Each of plural pistons slides and contacts to the swash plate 218.

The flexible isolating member 214 is provided in the interior portion of the body 204. One end of the flexible isolating member 214 is fixedly mounted on the swash plate 208 and other end of the flexible isolating member 214 is fixedly mounted on the body 204.

The fuel relief section 224 is isolated by the flexible isolating member 214 and receives the pressurized gasoline fuel along the axial direction motion by the swash plate 218. The fuel relief section 224 includes at least the different normal direction face of the swath plate 218.

The isolating section 221 is provided adjacent the fuel relief section 224 and is isolated by the flexible isolating member 214. This isolating section 221 receives the lubricating oil and includes the rotating motion converting mechanism.

Figure 10:
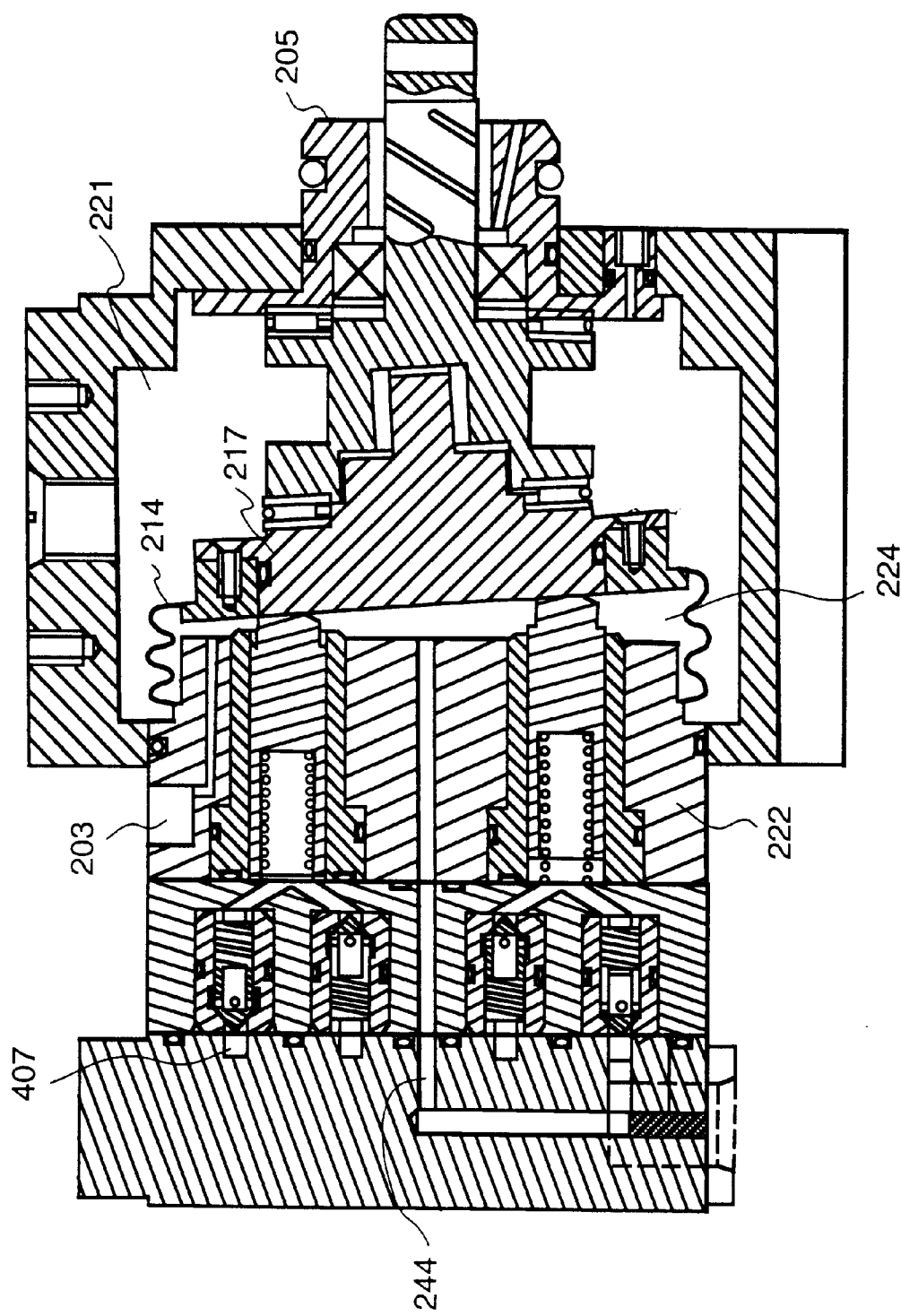
FIG. 10 is a cross-sectional view showing a further embodiment of a fuel pump according to the present invention.

FIG. 10 is across-sectional view showing a further embodiment of a fuel pump according to the present invention where one end of the flexible isolating member 214 is fixedly mounted of the swash plate 218, and the other end of the flexible isolating member 214 is fixedly mounted on the pressurizing body 222 of the pump mechanism.

In this embodiment of the fuel pump, the isolating section 221 and the fuel relief section 224 are separately formed by the flexible isolating member 214.

The isolating section 221 includes the rotating motion converting mechanism and receives the lubricating oil therein. The fuel relief section 224 includes at least the different normal direction face of the swash plate 217 and receives the gasoline therein.

The gasoline fuel is delivered from the fuel delivery hole 244 and passes through the fuel relief section 224 and after that the gasoline flows out the orifice 203.

The gasoline is delivered from the fuel delivery hole 244 and passes through the fuel delivery horizontal hole 408 and the fuel outlet circular groove 407. Thereafter, the fuel is led into the injector of the engine.

The gasoline fuel is included in the fuel relief section 224. The fuel is shielded by the flexible isolating member 214 but does not flow toward the side of the isolating section 221. The lubricating oil is included in the isolating section 221. The lubricating oil lubricates the bearing portion and the sealing portion of the rotating motion converting mechanism.

The flexible isolating member 214 is provided in the interior portion of the body 204. One end of the flexible isolating member 217 is fixedly mounted on the swash plate 218 and other end of the flexible isolating member 217 is fixedly mounted on the pressurizing body 222 of the pump mechanism portion.

The fuel relief section 224 is isolated by the flexible isolating member 217 and receives the gasoline fuel. The isolating section 221 is provided adjacent the fuel relief section 224 and is isolated by the flexible isolating member 217. The isolating section 221 receives the lubricating oil and includes the rotating motion converting mechanism.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A fuel pump, comprising a rotatable shaft driven by rotation of an internal combustion engine, a swash plate member engaged with a first bearing member and mounted on said rotatable shaft with a second bearing member therebetween such that a rotational motion of said rotatable shaft is converted to an axial inclined gyration movement of said swash plate member, and fuel is pressurized and compressed in an axial direction motion component of said swash plate member; and a single flexible isolating member, with one end of said flexible isolating member being completely sealed around an outer peripheral portion of fixed swash plate member to isolate a substance on one side of said flexible isolating member from another side of said flexible isolating member constituting an isolating section.

2. A fuel pump according to claim 1, wherein an interior portion of said flexible isolating member contains lubricating oil.

3. A fuel pump according to claim 1, wherein said flexible isolating member is made of impermeable material for preventing leakage of the fuel of the internal combustion engine to an interior volume defined by said flexible isolating member.

4. A fuel pump according to claim 1, wherein the isolating section of said flexible isolating member is filled with inert gas.

5. A fuel pump according to claim 1, wherein an end portion of said flexible isolating member is arranged to permit the axial inclined gyration movement of said swash plate member.

6. A fuel pump according to claim 1, wherein a portion of pressurized delivery fuel is discharged to a fuel relief section through an orifice to obtain lower pressure.

7. A fuel pump according to claim 6, wherein said fuel relief section encloses a contact region between said swash plate member and a fuel pressurizing and compressing portion acted upon by said swash plate member.

8. A fuel pump according to claim 1, further comprising a connecting portion for detecting pressure in an interior portion of said flexible isolating member.

9. A fuel pump, comprising:

a rotating shaft for transmitting a rotation from an outside source;

a swash plate member being engaged with a first bearing member and being fixed on one end of said rotating shaft via a second bearing member for rotating therewith and having a different normal direction face from an axial direction of said rotating shaft;

plural pressurizing chambers for pressurizing fuel; and a flexible isolating member for isolating a first fluid volume on one side thereof from a second fluid volume on another side thereof, and one end of said flexible isolating member being fixed to and over an entire periphery of said swash plate member.

10. A fuel pump, comprising:

a rotating shaft for transmitting a rotation from an outside source;

a swash plate member being engaged with a first bearing member and being fixed on one end of said rotating shaft for rotating therewith and having a different normal direction face from an axial direction of said rotating shaft;

plural pressurizing chambers for pressurizing fuel; and a single flexible isolating member for isolating a sliding and contacting portion one side of said flexible isolating member from another side of said isolating member, and one end of said flexible isolating member being fixed to said swash plate member completely around an entire periphery of said swash plate member.

11. A fuel pump system for an in-cylinder direct injection system internal combustion engine in which fuel is directly injected into a cylinder, comprising:

an injector for injecting the fuel;

a fuel pump for pressurizing the fuel; and a rotating shaft driven by a rotation of an internal combustion engine, a swash plate member engaged with a first bearing member and mounted on said rotating shaft with a second bearing member therebetween such that a rotating motion of said rotating shaft is converted to an axial inclined gyration movement of said swash plate member, and fuel is pressurized and compressed in an axial direction motion component of said swash plate member, a flexible isolating member being a single member, and one end of said flexible isolating member being fixed around the entire periphery of said swash plate member to isolate the fuel on one side of said flexible space formed by another side of said flexible isolation member.

12. A fuel pump, comprising:
a body;
a rotating shaft operatively mounted on said body;
a swash plate member provided with a first bearing member on an interior portion of said body and mounted at one end of s a id rotating shaft;
a pump mechanism portion arranged opposite said swash plate member and having plural pistons which slide and contact said swash plate member;
a first fluid section for receiving a first fluid which is pressurized according to an axial direction motion by said swash plate member;
a second fluid section adjacently provided on said first fluid section and receiving a second fluid and including said motion converting portion; and
a flexible isolating member constituted by a single member, one end of said flexible isolating member being fixed over an entire periphery of said swash plate member wherein,
said first fluid section and said second fluid section are isolated by said flexible isolating member, and
viscosity of the second fluid in said second fluid section is greater than viscosity of the first fluid in said first fluid section.

13. A fuel pump, comprising:
a body having an opening portion at one end;
a rotating shaft operatively mounted on said body;
a swash plate member provided with a first bearing member on an interior portion of said body and mounted at one end of said rotating shaft via a second bearing member;
a motion converting portion for converting a rotating motion of said rotating shaft to an inclined gyration movement of said swash plate member;
a pump mechanism portion provided on said opening portion of said body and arranged opposite said swash plate member, and said pump mechanism portion having plural pistons which slide and contact said swash plate member;
a first fluid section provided on a side of said pump mechanism portion for receiving a first fluid which is pressurized according to an axial direction motion by said swash plate member;
a second fluid section adjacently provided on said first fluid section for receiving a second fluid and including said motion converting portion; and
a flexible isolating member constituted by a single member, one end of said flexible isolating member being sealingly connected over an entire periphery of said swash plate member, wherein
said first fluid section and said second fluid section are isolated by said flexible isolating member, and
viscosity of the second fluid in said second fluid section is greater than viscosity of the first fluid in said first fluid section.

14. A fuel pump system for an in-cylinder direct injection system internal combustion engine in which fuel is directly injected into a cylinder comprising:
an injector for injecting the fuel;
a fuel pump for pressurizing the fuel;
a rotating shaft for transmitting rotation from an outside source;
a swash plate member fixed at one end of said rotating shaft via first and second bearing members so as to be moved by rotation of said rotating shaft and having a different normal direction face from an axial direction of said rotating shaft;
plural pressurizing chambers for pressurizing fuel;
a rotating motion converting mechanism for converting the rotating motion of said rotating shaft to a reciprocating motion of said swash plate member and for transmitting the reciprocating motion to said pressurizing chamber; and
a flexible isolating member for isolating said rotating motion converting portion, wherein
said flexible isolating member is constituted by a single member, one end of said flexible isolating member being sealingly fixed around an entire periphery of said swash plate member.

15. A fuel pump system for an in-cylinder direct injection system internal combustion engine in which fuel is directly injected into a cylinder, comprising:
an injector for injecting the fuel;
a fuel pump for pressurizing the fuel;
a rotating shaft for transmitting a rotation from an outside source;
a swash plate member fixed at one end of said rotating shaft via first and second bearing members so as to be moved by rotation of said rotating shaft and having a different normal direction face from an axial direction of said rotating shaft;
plural pressurizing chambers for pressurizing fuel;
a rotating motion converting portion for converting a rotating motion of said rotating shaft to a reciprocating motion of said swash plate member and for transmitting the reciprocating motion to said pressurizing chamber; and
a flexible isolating member for isolating a sliding and contacting portion formed between said swash plate member said rotating motion converting portion and said swash plate member, wherein
said flexible isolating member is constituted by a single member, one end of said flexible isolating member being sealingly fixed to said swash plate member around an entire periphery of said swash plate member.

16. A fuel pump system, comprising:
a body;
a rotating shaft rotatively supported on said body;
a swash plate member provided via a first bearing member on an internal portion of said body and mounted via a second bearing member at said rotating shaft so as to undergo an inclined movement;
a pump mechanism portion arranged opposite said swash plate member and having plural pistons, said plural pistons performed a reciprocating movement according to the inclined movement of said swash plate member;
a flexible isolating constituted by a single member, one end portion of said flexible isolating member being sealingly fixed along an entire periphery of said swash plate member and another end portion of said flexible isolating member being sealingly fixed to one of said body and said pump mechanism portion,
a first fluid section for receiving a first fluid which pressurized toward an axial direction motion by said swash plate member;
a second fluid section adjacently provided on said first section and configured for receiving as second fluid; wherein viscosity of the second fluid in said second fluid section is greater than viscosity of the first fluid in said first fluid section, said first fluid section and said second fluid section are isolated by said flexible isolating member, and said flexible isolating member is arranged to prevent a rotation of said swash plate member with rotation of said rotating shaft.

17. A fuel pump for use in an internal combustion engine, comprising:

a rotating shaft arranged to be driven by rotation of the internal combustion engine;

a fuel pressurizing mechanism having a plunger and a cylinder for pressurizing fuel therein;

a second mechanism operatively associated with said rotating shaft via first and second bearing members for reciprocating said plunger of said pressurizing mechanism by synchronizing rotation of the internal combustion engine in an axial direction motion component of said second mechanism, with the fuel being pressurized and compressed by a reciprocating movement of said plunger of said pressurizing mechanism; and a unitary impermeable flexible isolating member operatively associated with said second mechanism to prevent the fuel from leaking from an outer side of said flexible isolating member to an inner side of said flexible isolating member.

* * * * *